(12) United States Patent
Salgueiro et al.

(10) Patent No.: US 10,581,690 B2
(45) Date of Patent: Mar. 3, 2020

(54) UPDATE SPECIFIC POLICIES FOR INTERNET OF THINGS DEVICES

(71) Applicant: Cisco Technology, Inc., San Jose, CA (US)

(72) Inventors: Gonzalo Salgueiro, Raleigh, NC (US); Joseph M. Clarke, Cary, NC (US); Charles Calvin Byers, Wheaton, IL (US); M. David Hanes, Lewisville, NC (US)

(73) Assignee: Cisco Technology, Inc., San Jose, CA (US)

( * ) Notice: Subject to any disclaimer, the term of this patent is extended or adjusted under 35 U.S.C. 154(b) by 161 days.

(21) Appl. No.: 15/921,680

(22) Filed: Mar. 15, 2018

(65) Prior Publication Data
US 2019/0288913 A1    Sep. 19, 2019

(51) Int. Cl.
*H04L 12/24* (2006.01)
*H04L 29/08* (2006.01)
*G06F 8/65* (2018.01)

(52) U.S. Cl.
CPC .......... *H04L 41/0893* (2013.01); *G06F 8/65* (2013.01); *H04L 67/12* (2013.01)

(58) Field of Classification Search
None
See application file for complete search history.

(56) References Cited

U.S. PATENT DOCUMENTS

| | | | |
|---|---|---|---|
| 9,069,641 B2 | 6/2015 | Parry et al. | |
| 10,445,479 B2 * | 10/2019 | Rao | ............ H04L 63/107 |
| 2017/0060567 A1 | 3/2017 | Kim et al. | |
| 2017/0187807 A1 | 6/2017 | Clernon | |
| 2018/0189467 A1 * | 7/2018 | Rao | ............ H04L 67/04 |
| 2018/0191848 A1 * | 7/2018 | Bhattacharya | ........ H04L 67/22 |
| 2019/0042227 A1 * | 2/2019 | Sharma | .......... H04W 4/50 |

FOREIGN PATENT DOCUMENTS

GB    2542127    3/2017

OTHER PUBLICATIONS

Garcia-Morchon, O. et al.; State-of-the-Art and Challenges for the Internet of Things Security (Oct. 29, 2017).
Garcia-Morchon, O. et al.; State-of-the-Art and Challenges for the Internet of Things Security (Feb. 28, 2018).
Bhartiya, Swapnil; IOT Security: A Distributed Product Failure for the Ages; Jun. 23, 2017.
(Continued)

*Primary Examiner* — Brian Whipple
(74) *Attorney, Agent, or Firm* — Behmke Innovation Group LLC; James Behmke; Stephen D. LeBarron

(57) ABSTRACT

In one embodiment, an apparatus comprising at least one memory, and processing circuitry, the processing circuitry adapted to obtain combined data, the combined data including policy data, or a pointer to the policy data, the policy data relating to general access for an Internet of Things (IoT) device, and update metadata, or a pointer to the update metadata, the update metadata relating to at least one update that is relevant to the IoT device in accordance with at least one criterion, and cause access of the IoT device to the at least one update to be in accordance with an update specific policy that is based on the combined data.

20 Claims, 5 Drawing Sheets

(56) References Cited

OTHER PUBLICATIONS

Boubekeur, Fadwa et al.; IOT-Based Automated Distributed Threats (Oct. 2017).
Check, William A. et al.; Comments of the NCTA the Internet and Television Association, Jul. 28, 2017.
Garcia-Morchon, O. et al.; State-of-the-Art and Challenges for the Internet of Things Security (Jun. 19, 2017)
Geng, L. et al.; Problem Statement of Edge Computing Beyond Access Network for Industrial IOT; Oct. 30, 2017.
IETF; WG Review: Software Updates for Internet of Things (SUIT); Nov. 3, 2017.
Lear, Eliot et al.; Slinging MUD: Manufacturer Usage Descriptions How the Network Can Protect Things; 2016 Int'l Conference on Selected Topics in Mobile & Wireless Networking (MoWNet), Cairo, 2016, pp. 1-6. doi: 10.1109/MoWNet.2016.7496625.
Moran, B. et al.; A Firmware Update Architecture for Internet of Things Devices; Oct. 30, 2017.
Pauzi, Nik Fifi Sofia et al.; Performance Measurement of Secure TFTP Protocol for Smart Embedded Devices; 2014 IEEE Asia Pacific Conference on Wireless and Mobile, Bali, 2014, pp. 144-149, doi: 10.1109/APW/Mob.2014.6920276.
Polk, Tim et al.; Mitigating IOT-Based Automated Distributed Threats (Final version Nov. 2017).
Polk, Tim et al.; Mitigating IOT-Based Automated Distributed Threats (Draft—Oct. 2017).
Rich, S. et al. A Manufacturer's Perspective; Mar. 12, 2017.
Srinivasan, Kaushik et al.; Manufacturer Usage Description Specification Implementation [Viewed Dec. 2017].
Lear, E. et al.; Manufacturer Usage Description Specification (Mar. 8, 2017).
Moran, B. et al.; Firmware Manifest Format (Oct. 30, 2017).

* cited by examiner

UPDATE SPECIFIC POLICIES FOR INTERNET OF THINGS DEVICES

TECHNICAL FIELD

The present disclosure generally relates to Internet of Things (IoT) devices.

BACKGROUND

IoT devices may include IoT devices traditionally thought of as being in a network, and/or IoT devices not traditionally thought of as being in a network. IoT devices traditionally thought as being in the network may be implemented by physical units such as smartphone(s), laptop(s), personal computer(s), server computer(s), storage device(s), and/or drive(s), etc. IoT devices not traditionally thought of as being in a network may be implemented by physical units such as light(s) (e.g. light bulb(s)), appliance(s), vehicle(s), trash can(s), heating ventilating and air-conditioning (HVAC), window(s), window shade(s) and blind(s), door(s), lock(s), sensor(s), actuator(s), robot(s), hub(s), and/or camera(s), etc.

When an IoT device not traditionally thought of as being in a network becomes part of a network, the IoT device may be the source and/or the target of complications propagating over the network which pose, for example, configuration challenges and/or security threats.

BRIEF DESCRIPTION OF THE DRAWINGS

So that the present disclosure may be understood by those of ordinary skill in the art, a more detailed description may be had by reference to aspects of some illustrative implementations, some of which are shown in the accompanying drawings. The appended drawings, however, illustrate only some example features of the present disclosure and are therefore not to be considered limiting, for the description may admit to other effective features.

Figure 1:
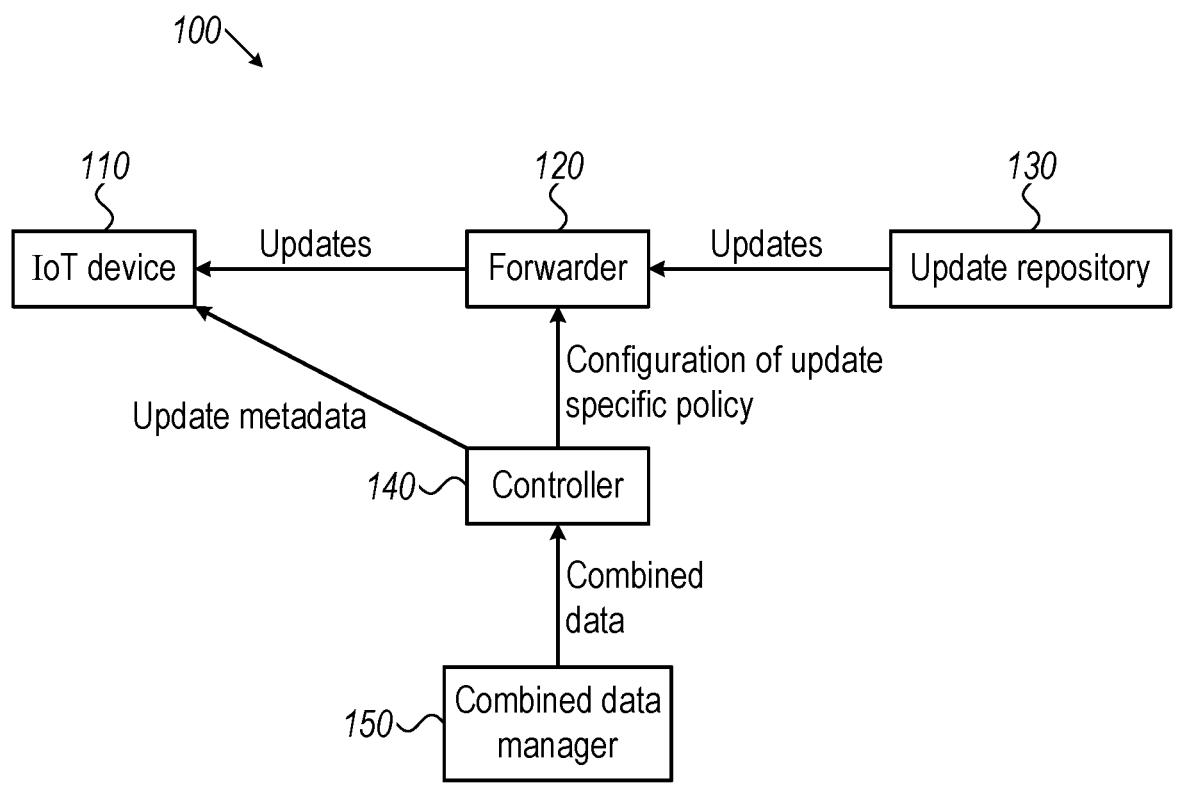
FIG. 1 is a functional block diagram of a system, in accordance with some embodiments of the presently disclosed subject matter.

In accordance with common practice the various features illustrated in the drawings may not be drawn to scale. Accordingly, the dimensions of the various features may be arbitrarily expanded or reduced for clarity. In addition, some of the drawings may not depict all of the functional modules, stages, and/or elements, etc. of a system, method, and/or apparatus, etc.

DESCRIPTION OF EXAMPLE EMBODIMENTS

Overview

There is provided, in accordance with some embodiments of the presently disclosed subject matter, an apparatus comprising at least one memory, and processing circuitry, the processing circuitry adapted to obtain combined data, the combined data including policy data, or a pointer to the policy data, the policy data relating to general access for an Internet of Things (IoT) device, and update metadata, or a pointer to the update metadata, the update metadata relating to at least one update that is relevant to the IoT device in accordance with at least one criterion, and cause access of the IoT device to the at least one update to be in accordance with an update specific policy that is based on the combined data.

There is further provided, in accordance with some embodiments of the presently disclosed subject matter, a method comprising obtaining combined data, the combined data including: policy data, or a pointer to the policy data, the policy data relating to general access for an Internet of Things (IoT) device, and update metadata, or a pointer to the update metadata, the update metadata relating to at least one update that is relevant to the IoT device in accordance with at least one criterion, formulating an update specific policy based on the combined data; and configuring access of the IoT device to the at least one update, to be in accordance with the update specific policy.

DETAILED DESCRIPTION OF EXAMPLE EMBODIMENTS

FIG. 1 is a functional block diagram of a system 100, in accordance with some embodiments of the presently disclosed subject matter. System 100 includes the following functional modules: an Internet of Things (IoT) device 110, a forwarder 120, an update repository 130, a controller 140, and a combined data manager 150. For simplicity's sake, each of IoT device 110, forwarder 120, update repository 130, controller 140, and combined data manager 150 are referred to in the single form, but may in various embodiments be implemented by a single physical unit (i.e. by a single box) or by a plurality of physical units. Such a plurality of physical units implementing a given functional module may be concentrated in one location, or distributed over a plurality of locations. Additionally or alternatively, IoT device 110, forwarder 120, update repository 130, controller 140, and combined data manager 150 are shown as separate rectangles in FIG. 1, but may not necessarily be implemented by separate physical units. For example, update repository 130 or a part thereof, and combined data manager 150 or a part thereof, may be implemented by the same physical unit. As another example, controller 140 or a part thereof, and forwarder 120 or a part thereof may be implemented by the same physical unit. As another example, controller 140 or a part thereof, and IoT device 110 or a part thereof, may be implemented by the same physical unit. As another example, controller 140 or a part thereof, and another IoT device (not shown) or a part thereof, may be implemented by the same physical unit. As another example, controller 140 or a part thereof, and combined data manager 150 or a part thereof may be implemented by the same physical unit; etc.

Communication (e.g. as represented by terms such as communicating, requesting, retrieving, transferring, providing, sending, instructing, receiving, distributing, emitting, checking, configuring, and/or accessing, etc.) between any two functional modules in FIG. 1 may be dependent on the one or more physical units which implement the two functional modules. For example, if the same physical unit implements at least part of each of the functional modules, communication may be internal. If separate physical units implement the two functional modules then the communication between the two functional modules may be via any protocol suitable for the communication (e.g. Hyper Text Transfer Protocol Secure (HTTPS), uniform resource identifier (URI) call back, publish/subscribe (pub/sub) such as Extensible Messaging and Presence Protocol (XMPP) bus, instant message protocol, WebRTC, Hyper Text Transfer Protocol (HTTP), Secure Copy Protocol (SCP), File Transfer Protocol (FTP), Trivial File Transfer Protocol (TFTP), Datagram Transport Layer Security (DTLS), Dynamic Host Configuration Protocol (DHCP), Link Layer Discovery Protocol (LLDP), the 802.1AR standard, NETCONF, RESTCONF, gRPC Network Management Interface (gNMI), Command Line Interface (CLI) over SSH (secure shell), CLI over HTTP, and/or NETFLOW/Internet Protocol Flow Information Export (IPFIX), etc.) Similarly, if a given functional module in system 100 is implemented by two or more physical units, the communication between the physical units may be via any protocol suitable for the communication (e.g. HTTPS, URI call back, pub/sub such as XMPP bus, instant message protocol, WebRTC, HTTP, SCP, FTP, TFTP, DTLS, DHCP, LLDP, the 802.1AR standard, NETCONF, RESTCONF, gNMI, CLI over SSH, CLI over HTTP, and/or NETFLOW/IPFIX, etc.). The connection(s) between various physical units implementing any of the functional module(s) shown in FIG. 1 may be wired (e.g. copper and/or fiber, etc.); and/or may be wireless (e.g. licensed and/or unlicensed, etc.).

Forwarder 120 may be adapted to control access with respect to IoT device 110. For example, forwarder 120 may be adapted to block, forward and/or perform other appropriate operation(s) on data originating from IoT device 110. Forwarder 120 may be adapted to block, forward, and/or perform other appropriate operation(s) on data that is destined for IoT device 110. Controller 140 may be adapted to configure forwarder 120 with a general policy so that forwarder 120 may be adapted to enforce the general policy, e.g. by blocking, forwarding, and/or performing such other operations, in accordance with the general policy. The general policy may be configured initially before IoT device 110 begins functioning in system 100. The general policy typically, although not necessarily, relates to general access (meaning typical access) for IoT device 110, enabling access for IoT device 110 that may be needed over time (e.g. over the lifetime that IoT device 110 functions, or until the general policy is replaced).

In accordance with embodiments of the presently disclosed subject matter, controller 140 may additionally or alternatively be adapted to configure forwarder 120 in accordance with an update specific policy. The update specific policy may be specific to one or more updates in update repository 130 that are relevant to IoT device 110 in accordance with at least one criterion. The configuration may therefore include configuring access of IoT device 110 to the update(s), to be in accordance with an update specific policy. The update(s) that may be accessed may include any suitable update(s) such as such as firmware update(s) (e.g. comprising firmware image(s)), software update(s), field programmable gate array configuration update(s), database content update(s) and/or update(s) of other digital content, etc.

Once forwarder 120 is configured in accordance with the update specific policy, forwarder 120 may be adapted to enforce the update specific policy for IoT device 110. For example, forwarder 120 may be adapted to block, forward, and/or perform other appropriate operation(s), in accordance with the update specific policy, on data, including the update(s), originating from and/or is destined for IoT device 110. IoT device 110 may access the update(s) that are in update repository 130, by way of forwarder 120, and therefore in accordance with the update specific policy enforced by forwarder 120.

One or more conditions may govern the operation of controller 140 and/or of forwarder 120, as will be described in more detail below. Such condition(s) may result in dynamic access of IoT device 110 to the update(s). For example, forwarder 120 may be configured so as to be adapted to enforce the update specific policy on a temporary basis until IoT device 110 has accessed the update(s).

The functionality of IoT device 110 may include any appropriate functionality. At least part of the functionality of IoT device 110 may be updateable, e.g. by way of installation of the update(s). The functionality of IoT device 110 may in some embodiments include restricted functionality such as restricted functionality that may be implemented by a constrained device (where a constrained device may be subject, for instance, to power, size, and/or security constraints). The functionality of IoT device 110 may in other embodiments include expanded functionality (e.g. including fog capabilities) compared to the restricted functionality that may be implemented by a constrained device.

The functionality of IoT device 110 may be implemented by one or more physical units. In some embodiments where a plurality of physical units implement the functionality of IoT device 110, a subset of the plurality of physical units may not necessarily be adapted to communicate with other physical unit(s) which implement other functional module(s) in system 100, except via another subset of the plurality of physical units. The functionality of IoT device 110 that is implemented by the other subset of the plurality of physical units may in such embodiments include functionality that may be implemented by a hub. The other subset of the plurality of physical units optionally also partly implements the functionality of other IoT device(s) (e.g. including implementing for the other IoT device(s) functionality that may be implemented by a hub). For example, in such embodiments where two physical units implement IoT device 110, a first physical unit may lack wireless functionality to connect to a wireless access point which at least partly implements forwarder 120, but may be connected via a cable to a second physical unit (e.g. a hub) which includes wireless functionality to connect to the wireless access point.

If IoT device 110 does access the update(s), information regarding access and/or installation of the update(s) on IoT device 110 may be collected. If IoT device 110 has not yet accessed the update(s), controller 140 may configure forwarder 120 for at least one action, as will be described in more detail below. Configuration (and/or reconfiguration) of forwarder 120 by controller 140 (e.g. in accordance with the update specific policy, and/or for at least one action, etc.) may include any appropriate operation(s) which enables forwarder 120 to be adapted to operate accordingly (e.g. to be adapted to enforce the update specific policy, and/or to be adapted to perform the at least one action, etc.).

Enforcement of the update specific policy may on the one hand encourage appropriate updating (or in other words encourage the installation of appropriate updates), and on the other hand discourage inappropriate updating (or in other words prevent installation of inappropriate updates). For example, the enforcement of the update specific policy may encourage appropriate updating and discourage inappropriate updating due to condition(s) that govern the operation of controller 140 and/or of forwarder 120, and/or due to there being at least one criterion for the update(s) to be relevant to IoT device 110. Appropriate updating, rather than inappropriate updating, may result in fewer complication(s) and/or malfunction(s), and/or may result in improved performance.

The update specific policy may be based on combined data. Combined data manager 150 may be adapted to form and optionally store combined data for IoT device 110 (and optionally other combined data for other IoT devices). The combined data may include update metadata regarding one or more updates (e.g. update(s) in update repository 130 that are relevant to IoT device 110 in accordance with at least one criterion), or a pointer to the update metadata. The combined data may further include policy data for IoT device 110 or a pointer to the policy data, where the policy data relates to general access (meaning typical access) for IoT device 110. Optionally, the combined data further includes other data, examples of which will be described below. Controller 140 may be adapted to use the combined data to formulate and to configure on forwarder 120 the update specific policy.

The policy data that may be included in the combined data may comprise all of the data included in a general policy for IoT device 110 (and therefore essentially may comprise the general policy); or may comprise a subset of the data included in a general policy. Data in the general policy may include, for example, information that is pertinent to retrieval and validity of the general policy, elements pertinent to a URI associated with the general policy, attestation/authentication information, quality of service information, and/or access control lists, etc. The access control lists, for example, may relate to appropriate and/or inappropriate types of network access for IoT device 110 with respect to resources (also referred to as classes of access) such as port(s), service(s) (e.g. hosts for cloud-based services), web server(s), repository/ies, controller(s), other functional module(s) in system 100 and/or functional module(s) not shown in system 100, resource(s) of a specified manufacturer type, local access (e.g. within a local area network including IoT device 110), access to non-local network part(s) (e.g. access to network part(s) outside of a local area network which includes IoT device 110) and/or other particular class(es) of access, etc. The pointer to the policy data that may be included in the combined data, may be a pointer to the general policy (or equivalently to all of the data included in the general policy), or may be a pointer to a subset of the data included in the general policy.

The update metadata that may be included in the combined data may comprise all of the metadata included in an update manifest (and therefore essentially may comprise the update manifest); or may comprise a subset of the metadata included in an update manifest. An update manifest may include metadata about one or more updates. Metadata in the update manifest may include, for example, for a particular update, the update package identifier, type of binary, information on intended IoT devices such as implemented hardware for the particular update to run, information on when the particular update is to be applied, information on where to store the particular update, details for accessing the particular update, dependencies on other update packages and/or manifests, information about the update manifest (e.g. version number, timestamp, and/or textual description, etc.), cryptographic information for protecting the particular update during transfer, and/or attestation/authentication information, etc. Details for accessing the particular update, may include, for example, particular transport type(s), particular protocol(s) (e.g. HTTP, FTP, SCP, DTLS, and/or TFTP, etc.), particular port(s), particular Internet Protocol (IP) address(es), and/or particular URI(s) etc. which may be used for accessing the particular update. The pointer to the update metadata that may be included in the combined data, may be a pointer to the update manifest (or equivalently to all of the metadata included in the update manifest), or may be a pointer to a subset of the metadata included in the update manifest. The update manifest, the general policy, and/or the combined data may be arranged as appropriate data structures, e.g. for transfer and/or storage if such transfer and/or storage are occurring.

In some embodiments, the general policy may, for example, be a Manufacturer Usage Description (MUD) policy. The update manifest may, for example, be a Software Updates for Internet of Things (SUIT) manifest. MUD and SUIT are in the process of being standardized by the Internet Engineering Task Force (IETF). The combined data may be achieved by way of an extension to the MUD policy, meaning by way of an extension to the information that would be included in a MUD policy in order to conform to the standard for the MUD policy. Additionally or alternatively, the combined data may be achieved by way of an extension to the SUIT manifest, meaning by way of an extension to the information that would be included in a SUIT manifest in order to conform to the standard for the SUIT manifest. For example, the MUD policy may be extended to include update metadata (e.g. to include a SUIT manifest), where the update metadata in the extension is metadata that would be included in a SUIT manifest which conforms to the standard for a SUIT manifest. The MUD policy may instead be extended to include a pointer to such update metadata (e.g. a pointer to a SUIT manifest). The MUD policy may also be extended to include other data. The combined data may therefore comprise the MUD policy with the extension for the update metadata (e.g. for the SUIT manifest) or the pointer and optionally for other data. In such combined data, the policy data may therefore comprise the MUD policy (or equivalently all of the data in the MUD policy).

Additionally or alternatively, for example, a SUIT manifest may be extended to include policy data (e.g. to include a MUD policy), where the policy data in the extension is data that would be included in a MUD policy which conforms to the standard for a MUD policy. The SUIT manifest may instead be extended to include a pointer to such policy data (e.g. a pointer to a MUD policy). The SUIT manifest may also be extended to include other data. The combined data may therefore comprise the SUIT manifest with the extension for the policy data (e.g. for the MUD policy) or the pointer and optionally for other data. In such combined data, the update metadata may therefore comprise the SUIT manifest (or equivalently all of the metadata in the SUIT manifest).

Figure 2:
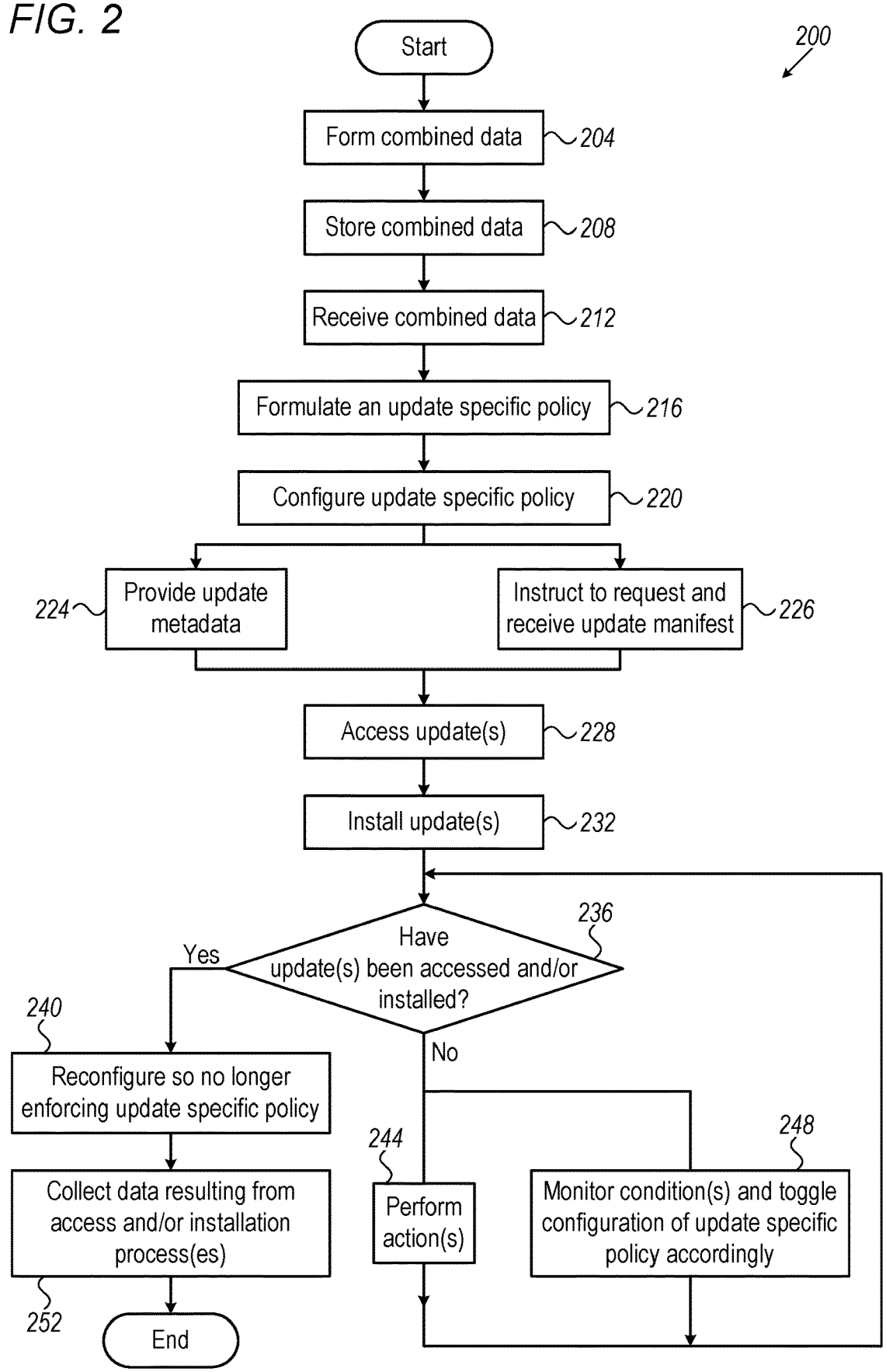
FIG. 2 is a flowchart of a method, in accordance with some embodiments of the presently disclosed subject matter.

FIG. 2 is a flowchart of a method 200, in accordance with some embodiments of the presently disclosed subject matter. Method 200 will be described with reference to the functional modules shown in FIG. 1.

In stage 204, combined data is obtained by combined data manager 150. The obtaining of the combined data, by combined data manager 150, may include the forming of the combined data by combined data manager 150. The combined data may comprise the update metadata or the pointer to the update metadata, and the policy data or the pointer to the policy data, as described above. Optionally the combined data may comprise other data such as a time parameter indicative of a next time that controller 140 is to check with combined data manager 150 for combined data for IoT device 110, and/or condition(s) relating to operation of controller 140 and/or forwarder 130 which will be described in more detail below. Therefore the forming of the combined data may be performed by including in the combined data the various components of the combined data (e.g. update metadata or pointer to update metadata, policy data or pointer to policy data, time parameter, and/or conditions, etc.) The forming may in some embodiments include extending a MUD policy and/or SUIT manifest, as described above. As also described above, one or more physical units may implement combined data manager 150. In some embodiments where a plurality of physical units implements combined data manager 150, the plurality may include a physical unit storing a general policy for IoT device 110, and a separate physical unit (e.g. in a different location) storing an update manifest for the update(s). In such embodiments, such physical units may communicate, e.g. via HTTPS, URI call back, pub/sub such as XMPP bus, instant message protocol, webRTC, when forming the combined data. It is noted that the general policy and the update manifest may not necessarily be stored in separate physical units.

The combined data may be formed upon any appropriate event. For example, the event may include the storing of one or more updates in update repository 130. When the update(s) are stored, update metadata regarding the update(s) may be distributed, including to controller 140. For example, the update metadata may be distributed in accordance with prior registration for such update(s), or may be distributed more widely. The update metadata may be distributed in any suitable form, such as in the form of an update manifest having an appropriate data structure (e.g. in the form of a SUIT manifest) which includes the update metadata. Controller 140 may be adapted to determine, based on the update metadata, that the update(s) are relevant, in accordance with at least one criterion, to IoT device 110 for which controller 140 is responsible (e.g. controller 140 having previously configured policy for IoT device 110 on forwarder 120). Controller 140 may subsequently instruct combined data manager 150 to form the combined data for IoT device 110.

As another example, the event may additionally or alternatively include a trigger by controller 140. The trigger may include, for instance, controller 140 checking for update(s) relevant to IoT device 110, in accordance with at least one criterion. Controller 140 may be adapted to check for such update(s) in update repository 130 from time to time (e.g. periodically or episodically), upon instigation by IoT device 110 (e.g. whenever IoT device 110 emits a uniform resource identifier (URI)), and/or upon a determination by controller 140 that IoT device 110 may be required to be updated, etc. For example, controller 140 may check for such update(s) by checking for update manifest(s) associated with such update(s). If controller 140 detects such update(s) for IoT device 110, controller 140 may subsequently instruct combined data manager 150 to form the combined data for IoT device 110.

In either of the above two examples, controller 140 optionally provides an indication to combined data manager 150 of one or more of the components to be included in the combined data. Combined data manager 150 may use the indication to form the combined data. For instance, controller 140 may provide the URI of the general policy and/or an identifier of the update manifest (e.g. version number, timestamp, etc.) to combined data manager 150.

As another example, the event may include combined data manager 150 obtaining the update metadata, e.g. when the update(s) are stored in update repository 130. Combined data manager 150 may then form respective combined data, for one or more IoT device(s), including IoT device 110, for which the update(s) are relevant. The combined data for a particular IoT device of such IoT device(s) (e.g. for IoT device 110) may include the update metadata, or the pointer to the update metadata, and the respective policy data, or the respective pointer to the respective policy data for the particular IOT device (e.g. for IoT device 110).

Relevant update(s) may be update(s) that are relevant in accordance with at least one criterion. The criterion/criteria of a relevant update for IoT device 110 may include that the update is installable on IoT device 110. For example, the type(s) of IoT device(s), the type(s) of processor(s), the type(s) of other hardware, dependency on previous update (s), etc., which may limit which IoT device(s) may install the update, may be noted in the update manifest for the update. Additionally or alternatively the criterion/criteria for a relevant update may include that the update has not yet been accessed by IoT device 110. For example, IoT devices which already accessed the update may be indicated in update repository 130; or controller 140 may determine if IoT device 110 did not yet access the update by monitoring IoT device 110 and/or forwarder 120 (e.g. as described below for stage 236). Additionally or alternatively the criterion/criteria for a relevant update may include that the update may be useful for IoT device 110. For example, a textual description in the update manifest for the update may be indicative that the update is useful against vulnerability to particular complication(s) such as malware and/or remote compromise (e.g. posing configuration challenge(s) and/or security threat(s)) which may target IoT device 110, useful against complication(s) that have compromised IoT device 110, useful to improve the performance of IoT device 110, and/or useful with respect to malfunction(s) of IoT device 110, etc. Additionally or alternatively, the criterion/criteria for a relevant update may include that the update has not been superseded by a newer update and/or any other suitable criterion/criteria. For example, the update manifest for an update may include a version number. Additionally or alternatively, the criterion/criteria for a relevant update may include that the update has been attested/authenticated, e.g. signed and/or certified by a trusted authority as being genuine, complete and/or not tampered with. A threshold of relevance for a particular update may vary depending on the example. A particular update may be relevant, in one example, as long the particular update is installable on IoT device 110; whereas in another example, the particular update may be relevant if the particular update is installable on IoT device 110 and also useful against vulnerability of the IoT device 110 to a particular complication that may target IoT device 110.

In optional stage 208, the combined data may be stored by combined data manager 150 in memory, for example in memory included in the physical unit(s) which implement combined data manager 150. For instance, the memory in which the combined data is optionally stored may be in one or more of the physical unit(s) storing the general policy for IoT device 110, and/or storing the update manifest for the update(s); or may be in other physical unit(s). In certain cases where the combined data is stored in the physical unit(s) storing the general policy and/or the update manifest, the combined data may replace the general policy and/or the update manifest in memory. Stage 208 may be omitted in some embodiments. For example, the combined data may not be stored, if providing the combined data in stage 212 is sufficient to execute the remainder of method 200.

In stage 212, the combined data is provided by combined data manager 150 to controller 140. Controller 140 obtains the combined data by receiving the combined data from combined data manager 150. By sending the combined data to controller 140 in stage 212, combined data manager 150 may cause one or more later stages of method 200 to occur and may thus cause access of IoT device 110 to the at least one update to be in accordance with an update specific policy that is based on the combined data. If both stage 208 and 212 are performed, the stages may be performed in any order or in parallel.

The combined data may be provided to controller 140 in stage 212 upon any appropriate event. For example, an appropriate event may include the formation and/or storage of the combined data in stages 204 and/or 208. Once the combined data is formed and/or stored, the combined data may be provided to controller 140. The combined data may be provided to controller 140, for instance, because controller 140 instructed combined data manager 150 to combine the data. Additionally or alternatively, the combined data may be provided to controller 140 because controller 140 is responsible for IoT device 110 and subscribed under a pub/sub model to receive such combined data. Therefore the provision of the combined data to controller 140 may include publishing/subscribing. As another example, the event may include a trigger by controller 140, such as a checking with combined data manager 150 for combined data for IoT device 110. Such a checking by controller 140 may be instigated by IoT device 110, e.g. the checking occurring whenever IoT device 110 emits a URI; may be time-based; and/or may occur upon a determination by controller 140 that IoT device 110 may be required to be updated; etc. For instance, with respect to time based checking, previously combined data for IoT device 110 that was previously provided to controller 140 may have included other data such as a time parameter indicative of a next time that controller 140 is to check with combined data manager 150 for combined data for IoT device 110; or controller 140 may be adapted to check for combined data periodically or episodically.

In embodiments where IoT device 110 is adapted to emit a URI (e.g. as described above with reference to the description of stage 204 and/or 212), the emitted URI may be provided to controller 140 using any appropriate procedure, e.g. by way of DHCP, by way of LLDP, and/or by way of the 802.1AR standard, etc. As another example, if controller 140 is at least partly implemented by one or more physical units implementing IoT device 110, the emitting and providing may be internal to the physical unit(s). The URI may be emitted, for instance, in response to a request by controller 140 to emit the URI, or independently of any such request, if occurring.

As mentioned above, a trigger for stage 212 may include controller 140 checking for combined data when IoT device 110 emits a URI. In some embodiments, the emitted URI may be indicative of the general policy, and may be indicative of the combined data. In some other embodiments, the emitted URI may be indicative of the general policy but not of the combined data. In the latter embodiments, controller 140 and/or combined data manager 150 may be adapted to translate the emitted URI to a URI that is indicative of the combined data.

In some embodiments where IoT device 110 is adapted to emit a URI, an update that is installed on IoT device 110 may change the URI that is subsequently emitted by IoT device 110, e.g. to still be indicative of the general policy but also be indicative that the IoT device has been updated. In such embodiments, controller 140 may compare an emitted URI, to determine which updates, if any, have been installed. If controller 140 determines, based on the comparison, that IoT device 110 has not been updated in accordance with at least one benchmark, controller 140 may consequently determine that IoT device 110 may be required to be updated. Controller 140 may then perform the checking as described above with reference to stage 204 and/or 212. For example, the at least one benchmark may include: last updating having occurred within a particular time period, previous update(s) having been installed, and/or previous update(s) deemed critical by controller 140 having been installed, etc. Critical update(s) may include, for example, update(s) that are useful against the vulnerability of IoT device 110 to particular complication(s) which may target IoT device 110, useful against complication(s) that have compromised IoT device 110, useful against malfunction(s) of IoT device 110, and/or useful to improve the performance of IoT device 110, etc. In other embodiments, the updating of IoT device 110 may not change the URI emitted by IoT device 110.

In some embodiments, controller 140 may determine that IoT device 110 has not been updated in accordance with at least one benchmark (and therefore that IoT device 110 may be required to be updated) by way of one or more other monitoring procedures in addition to or instead of comparison of an emitted URI. For example, the other monitoring procedure(s) may include receiving (e.g. from validation checks, a reporting mechanism such as HTTP, an exposed application programming interface (API) and/or an exposed HTTP interface, etc.) information indicative of the current version installed on IoT device 110, whether or not IoT device has been compromised, and/or of the state of the IoT device (e.g. operating normally or malfunctioning, and/or performing as before or improved performing). Additionally or alternatively, the other monitoring procedure(s) may include monitoring (e.g. by way of NETFlow/IPFIX) the traffic via forwarder 120; and/or receiving or not receiving an indication from IoT device 110 and/or from update repository 130 that previous updates were accessed; etc. In such embodiments, controller 140 may then perform the checking as described above with reference to stage 204 and/or 212.

Additionally or alternatively, controller 140 may determine that IoT device 110 may be required to be updated, based on the vulnerability of IoT device 110 to a particular complication that may target IoT device 110. Such a determination may be made irrespective of the status of past updating. Controller 140 may then perform the checking as described above with reference to stage 204 and/or 212. For example, controller 140 may be responsible for various IoT devices (including IoT device 110) not all of which may necessarily be vulnerable to the particular complication, and therefore not all of which may be required to be updated. Continuing with describing such an example, certain IoT devices, including IoT device 110, may be impacted by the WPA2 Krack vulnerability. Controller 140 may determine which IoT devices are vulnerable (e.g. including IoT device 110) based on, for instance, security and/or transport characteristics, network readiness threshold triggers, and/or any other appropriate characteristics. Such characteristics may be listed, for example, in the general policy of IoT device 110, or may be otherwise determinable by controller 140. Additionally or alternatively, controller 140 may determine which IoT devices are vulnerable (e.g. including IoT device 110) based on reports such as by US-CERT, and/or a vendor response team, etc. Such reports may be reported, for instance, in Open Vulnerability and Assessment Language (OVAL).

Communication between combined data manager 150, controller 140, and/or update repository 150 in any of stages 204 to 212 may be internal if at least partly implemented on the same physical unit, and/or may include any appropriate protocol such as HTTPS, URI call back, pub/sub such as XMPP bus, instant message protocol, and/or WebRTC, etc., if between physical units.

In stage 216, controller 140 uses the combined data to formulate an update specific policy which allows IoT device 110 to access the update(s). The resulting update specific policy is thus based on the combined data. The formulation by controller 140 in stage 216 may include controller 140 determining the update specific policy based on the combined data. If the combined data included one or more pointers to the update metadata and/or to the policy data, then as part of the determination, controller 140 may use the pointer(s) to receive the update metadata and/or policy data, e.g. from combined data manager 150. In some embodiments, formulation of the update specific policy may further include arrangement of the update specific policy in an appropriate data structure, e.g. for transfer and/or storage, if desirable. For example, if the formulation and configuration are performed by separate physical units implementing controller 140 transfer may be desirable. In such embodiments, the update specific policy may be transferred and/or stored.

The update specific policy formulated in stage 216 may include, for instance, access control list(s) relating to the at least one update. The access control list(s) in the update specific policy may specify one or more classes of access such as the resource of update repository 150, particular port resource(s), and/or other resource(s). Additionally or alternatively such access control list(s) may specify the manner of access with respect to IoT device 110 and such resource(s), the manner including, for instance, usage of particular transport type(s), particular protocol(s), particular IP address(es) and/or particular URI(s), etc. For example, such access control list(s) may restrict access, compared to the access control list(s) in the policy data, for instance, by allowing access with respect to a subset of the resources, with respect to which access is allowed in accordance with the access control list(s) in the policy data; and/or by restricting the manner of access with respect to certain resource(s), where the manner of access was unrestricted in accordance with the access control list(s) in the policy data. Controller 140 may formulate such access control list(s) in the update specific policy, for instance, by determining the intersection between the details for accessing the update(s) that are specified in the update metadata that is included in or pointed to by the combined data, and the access control list(s) specified in the policy data that is included in or pointed to by the combined data.

As another example, the access control list(s) in the update specific policy may expand access compared to the access control list(s) in the policy data by allowing access with respect to certain resource(s), in order for IoT device 110 to access the update(s), where access with respect to such resource(s) was not allowed in accordance with the access control list(s) in the policy data. Controller 140 may formulate such access control list(s) in the update specific policy, for instance, if there is insufficient intersection between the details for accessing the update(s) in the update metadata and the access control list(s) in the policy metadata.

As another example, compared to the access control list(s) in the policy data, the access control list(s) in the update specific policy may on the one hand restrict access with respect to certain resource(s) (e.g. by restricting the number of resources that may be accessed, and/or the manner of accessing), while on the other hand expand access with respect to other resource(s) (e.g. by allowing access to certain resource(s) that was not allowed in the general policy). Controller 140 may formulate such access control list(s) in the update specific policy, for instance, when there is partial intersection between the details for accessing the update(s) in the update metadata and the access control list(s) in the policy metadata. In any of the above examples of the access control list(s) in the update specific policy, the access control list(s) relating to the update(s) may not necessarily be more restrictive than the details for accessing the update(s) specified in the update metadata.

In some embodiments, the update specific policy may include one or more conditions with regard to operation of forwarder 130, and more specifically with regard to enforcement of the update specific policy by forwarder 130. Such condition(s) may include condition(s) which were specified (e.g. as other data) in the combined data (e.g. due to being particular to the update(s)); and/or condition(s) which were not specified in the combined data but which are generated and/or applied by controller 140 during the formulation of the update specific policy. For example, the update specific policy may include an expiration condition, e.g. that is time based or that is based on one-time access, so that when configured with such an update specific policy, forwarder 130 ceases enforcing the update specific policy after the expiration of a specified expiration time or after a one time access by IoT device 110 to the update(s). As another example, the update specific policy may allow access to the update(s) in accordance with the access control list(s) in the update specific policy when the at least one condition is applicable. The update specific policy that is formulated may not necessarily be unique to the particular update(s) and/or IoT device 110, and may in some cases be the same as update specific policies formulated for other updates and/or IoT devices.

In some embodiments, in addition to access control list(s), the update specific policy may include information, such as quality of service information, that is based on the combined data (e.g. more specifically based on the policy data and/or the update metadata, that is included in the combined data, and/or that has pointer(s) pointing thereto included in the combined data).

In stage 220, controller 140 configures forwarder 120 in accordance with the update specific policy. As mentioned above, configuration may include any appropriate operation(s) enabling forwarder 120 to be adapted to enforce the update specific policy. For example, such operation(s) may be performed using protocol(s) such as NETCONF, RESTCONF, gNMI, CLI over SSH, and/or CLI over HTTP, etc.

In some embodiments, the update specific policy, when configured on forwarder 120, may override the general policy, so that the only permitted access is with respect to the update(s). For example, the general policy may be replaced by the update specific policy; or if a plurality of physical units implement forwarder 120, the update specific policy may be configured in a physical unit implementing forwarder 120 that is further in the path away from IoT device 110 than a physical unit implementing forwarder 120 that is configured for the general policy. In other embodiments, both the general policy and the update specific policy may be enforced concurrently on forwarder 120, with the update specific policy enforced for access with respect to IoT device 110 and the update(s); and the general policy enforced for all other access regarding IoT device 110. If both the general policy and the update specific policy are enforced concurrently, both may be configured on one of the physical unit(s) implementing forwarder 120; or if there is a plurality of physical units implementing forwarder 120, the general policy and the update specific policy may be suitably implemented on separate physical units.

Referring to stages 216 and 220, controller 140, may cause access of IoT device 110 to the at least one update to be in accordance with the update specific policy, by way of formulating the update specific policy in stage 216, by way of optionally sending the formulated update specific policy between physical units implementing controller 140 (if the formulation and configuration are performed by separate physical units implementing controller 140) and/or by way of the configuration in stage 220 of forwarder 120.

In stage 224, controller 140 provides the update metadata to IoT device 110. The update metadata may have been included in the combined data. Alternatively, a pointer to the update metadata may have been included in the combined data, and controller 140 may provide to IoT device 110, the update metadata pointed to by the pointer. Controller 140 may instead provide the pointer to the update metadata to IoT device 110, but for simplicity's sake, such an alternative is not elaborated upon below. Optionally, controller 140 also provides the policy data, or the pointer to the policy data, that is in the combined data to IoT device 110, (e.g. which IoT device 110 may ignore). For example, all of the combined data may be provided to IoT device 110.

In some embodiments, stage 224 is optional and may be omitted. For example, stage 224 may be omitted because IoT device 110 may have previously received the update metadata when the update metadata was distributed (see above description of stage 204). In such an example, IoT device 110 may emit a URI subsequent to receiving the update metadata, and controller 140 may then check for updates as further described above with reference to stage 204. As another example, stage 224 may be omitted if the update metadata included in the combined data is insufficient for enabling IoT device 110 to access the update(s), or if for any other reason controller 140 does not provide the update metadata to IoT device 110. In such an example, stage 224 may be replaced by optional stage 226. In optional stage 226 controller 140 may instead instruct IoT device 110 to request and receive the update manifest; and IoT device 110 may request and receive the update manifest. Controller 140 may provide the update metadata in stage 224, or instruct IoT device 110 in stage 226, in any appropriate manner. For example, the update metadata may be provided to IoT device 110, or IoT device 110 may be instructed, by way of HTTP and/or any other appropriate protocol(s). As another example, if controller 140 is at least partly implemented by physical unit(s) implementing IoT device 110, the providing or instructing may be internal to the physical unit(s).

Referring to stages 216 to 226, based on at least one condition relating to operation of controller 140 and/or forwarder 120, controller 140 may determine whether or not to formulate and configure the update specific policy on forwarder 120, and/or whether or not to provide the update metadata/instruct IoT device 110. Additionally or alternatively, based on the at least one condition, controller 140 may control the timing of the formulation and configuration of the update specific policy, enforcement of the update specific policy, and/or provision of update metadata/instruction to IoT device 110.

At least part of such condition(s), may have been included in the combined data (e.g. as other data). For example such condition(s) may have been included in the combined data due to being particular to the update(s). Additionally or alternatively, controller 140 may be adapted to generate and/or apply condition(s), which are not included in the combined data. For example condition(s) may be generated and/or applied in order to determine whether or not to configure forwarder 120 and/or to provide the update metadata/instruct IoT device 110; and/or in order to govern the timing of formulation and configuration of the update specific policy, enforcement of the update specific policy, and/or provision of update metadata/instruction to IoT device 110.

For example, the condition(s) may include any appropriate condition(s) for determining whether or not to formulate and configure the update specific policy and/or whether or not to provide the update metadata/instruct IoT device 110. Such condition(s) may include, for instance, reliability of the combined data and/or threshold of relevance of the update(s), etc. If, controller 140 does not trust the combined data as being reliable, for any appropriate reason, controller 140 may not necessarily formulate and configure the update specific policy, and may not necessarily provide the update metadata/instruct IoT device 110. If the combined data relates to update(s) which are relevant, but the threshold of relevance is low, controller 140 may not necessarily formulate and configure the update specific policy, and may not necessarily provide the update metadata/instruct IoT device 110. For instance, the update(s) may have been deemed relevant, solely due to the type of processor used in the implementation of IoT 110, and therefore the threshold of relevance may be considered low. In the latter instance, controller 140 may determine, based on to the current version and/or state of IoT device 110, not to formulate and configure the update specific policy and not to provide the update metadata/instruct IoT device 110. If controller 140 determines not to formulate and configure the update specific policy, and not to provide the update metadata/instruct IoT device 110, method 200 may end after the determination.

As another example, the condition(s) may include any appropriate condition(s) for governing the timing of formulation and configuration of forwarder 120, provision of update metadata/instruction to IoT device 110, and/or enforcement of the update specific policy by forwarder 120. Such condition(s) may include condition(s) relating to time of day, time since last updating, network load, time slice(s) when update(s) are available in update repository 130, and/or expiration of update specific policy, etc. If the condition(s) include condition(s) relating to time of day, network load and/or time slices when update(s) are available, the formulation and configuration, provision/instruction, and/or access to update(s) enforced (e.g. allowed) by forwarder 120, may be restricted to certain time(s) of day, to certain network load condition(s), and/or to certain time slice(s) when the update(s) are available. If the condition(s) include condition(s) relating to time since last updating of IoT device 110, the formulation and configuration, provision/instruction, and/or access to update(s) enforced (e.g. allowed) by forwarder 120 may be permitted as long as a given time period has passed since the last updating. If the condition(s) include an expiration condition, the formulation and configuration, provision/instruction, and/or enforcement of the update specific policy by forwarder 120 may no longer occur after the expiration. Condition(s) relating to enforcement by forwarder 120 may have been included in the update specific policy as described above with reference to stage 216, so that forwarder 120 may apply the condition(s) regarding enforcement. Additionally or alternatively, condition(s) relating to enforcement by forwarder 120 may be applied by controller 140, for example, by configuring the update specific policy, and removing the configuration of the update specific policy in accordance with the condition(s) (e.g. as described below with reference to stage 248).

In stage 228, IoT device 110 accesses the update(s) which are in update repository 130. For example, the update metadata received by IoT device 110 from controller 110 in stage 224, or received previously, or the update manifest which was requested and received in stage 226, may include details for accessing the update(s) that are less restrictive (e.g. including more alternatives for transport types, protocols, ports, URIs, and/or IP addresses, etc.) than the access control list(s) in the update specific policy that is being enforced. Forwarder 120 enforces the update specific policy in order to enable IoT device 110 to access the update(s) in update repository 130 in accordance with the update specific policy. In some embodiments, update repository 130 may be implemented in a plurality of distributed physical units, and IoT device 110 may access the update stored in cache memory in the closest physical unit.

In stage 232, IoT device 110 installs the update(s). IoT device 110 may use any suitable techniques to install the update(s).

In optional stage 236, controller 140 may determine whether or not IoT device 110 has accessed the update(s) and/or may determine whether or not IoT device 110 has installed the update(s). For example, controller 140 may monitor IoT device 110 in order to determine whether or not IoT device 110 has accessed and installed the update(s). Controller 140 may monitor the URI, if modifiable by update(s), that is emitted by IoT device 110. Controller 140 may additionally or alternatively monitor other information indicative of the current version installed on IoT device 110, whether or not IoT device 110 has been compromised, and/or of the state of IoT device 110 (e.g. operating normally or malfunctioning, and/or performing as before or improved performing, etc.), etc. The information may result from validation checks that may be performed, a reporting mechanism such as HTTP, an exposed application programming interface (API), and/or an exposed HTTP interface, etc. As another example, controller 140 may monitor (e.g. by way of NETFlow/IPFIX) the traffic via forwarder 120 to determine whether or not the update(s) were accessed by IoT device 110. As another example, controller 140 may determine whether or not IoT device 110 has accessed the update(s), dependent on whether or not indication(s) are received from IoT device 110 and/or update repository 130 that are indicative that the update(s) were accessed.

In optional stage 240, controller 140 may reconfigure forwarder 120 so that forwarder 120 no longer enforces the update specific policy. Subsequent to the reconfiguration, forwarder 120 may enforce the general policy and may no longer enforce the update specific policy. Stage 240 may follow, for example, a determination in stage 236 that IoT device 110 has accessed the update(s). Stage 240 may be omitted, for example, if the update specific policy configured in stage 220 allowed one time access to the update(s) as a condition. In such an instance, once the update(s) have been accessed, the update specific policy would expire, and forwarder 120 would instead enforce the general policy.

In optional stage 244, controller 140 may configure forwarder 120 to perform at least one action with respect to IoT device 110, if IoT device 110 has not yet installed the at least one update. Stage 244 may follow (e.g. as soon as possible afterwards or after a certain delay) a determination in stage 236 that IoT device 110 has not installed the update(s). Additionally or alternatively, stage 244 may be part of stage 220, meaning that the action(s) may be configured during stage 220 and may continue to be performed until a determination in stage 236 that IoT device 110 has installed the update(s). In some cases, controller 244 may configure forwarder 120 to perform the at least one action, if IoT device 110 has not yet installed the at least one update and the uninstalled update(s) are critical.

The at least one action with respect to IoT device 110 may include any suitable action(s). For example, forwarder 120 may be adapted to quarantine IoT device 110 (e.g. blocking IoT device 110 from any accessing). As another example, forwarder 120 may be adapted to block access (e.g. by blocking data) with respect to IoT device 110 and certain resource(s); but allow access (e.g. by forwarding data) with respect to IoT device 110 and certain other resource(s). As another example, forwarder 120 may be adapted to modify the routing of data originating from IoT device 110 compared to the routing that would have been applied to such data.

As another example, forwarder 120 may be adapted to use a trustworthiness metadata channel for data originating from IoT device 110 to indicate the trustworthiness of the data. In some embodiments, a trustworthiness metadata channel may be established and used for data originating from IoT device 110 upon the configuration of the action(s) in stage 244; whereas in other embodiments, a trustworthiness metadata channel may be used regardless of the status of update installation, but the trustworthiness metadata may vary depending on the status of the update installation. In any of such embodiments for the latter example, the trustworthiness metadata channel may be implemented using any appropriate procedure such as security group tag, IPV6 extension headers, network service headers (e.g. in a service function chaining environment), segment routing (SR) headers, and/or other type(s) of marking/tagging, etc. The trustworthiness metadata channel may include a binary indication of whether or not the data is trustworthy (e.g. trustworthy or not trustworthy), an indication only when the data is not trustworthy, and/or a trustworthiness score (e.g. low, medium or high). For instance, a trustworthiness score may be dependent on one or more factors such as which update(s) were installed (if any), and which were not (if any), the criticality of update(s) installed or not installed, whether or not the data is encrypted, known vulnerability in IoT device 110 (e.g. in firmware of IoT device 110), a history of vulnerability of IoT device 110, and/or sources of attestation/authorization of the data, etc. The trustworthiness metadata channel optionally includes other information such as information about IoT device 110 (e.g. information about the firmware of IoT device 110).

The trustworthiness metadata channel may be used by an element which receives the data originating from IoT device 110 to determine whether or not to trust the data and/or consequent treatment of the data. For example, the trustworthiness metadata channel for data originating from IoT device 110 may be indicative of the data not being trustworthy or having a low trustworthiness score. An element which receives such data, may determine whether or not to trust the data, and if determined to not trust the data may, for instance, downgrade the received data and/or may use other information to validate the data (e.g. validation data from other IoT devices, and/or challenge response, etc.). Examples of such a receiving element(s) may include a firewall, a network address translation gateway, a fog node, or any other appropriate element. Action(s) configured in stage 244 may continue to be performed by forwarder 120 until controller 140 removes the configuration of the action(s). For example, controller 140 may remove the configuration of the action(s), upon controller 140 determining in a subsequent iteration of stage 236 that the updates were installed, or upon controller 140 determining that the non-installed update(s) are no longer relevant in accordance with the at least one criterion. Controller 140 may determine that the non-installed update(s) are no longer relevant, for instance, because of newer update(s) in update repository 130 superseding the non-installed update(s). In some embodiments, stage 244 may be omitted, and no action(s) may be configured due to the IoT device 110 not having yet installed the update(s). For example, action(s) may not necessarily be configured if forwarder 120 enforces the update specific policy, and not the general policy, e.g. until expiration of an expiration condition included in the update specific policy, or until controller 140 removes the configuration of the update specific policy such as in a subsequent iteration of stage 240.

In optional stage 248, controller 140 may monitor the condition(s) governing the timing of enforcement of the update specific policy. If such condition(s) are indicative that the update specific policy is not to be currently enforced, then controller 140 may reconfigure forwarder 120 so that forwarder 120 is subsequently not configured for the update specific policy. For example, subsequent to such a reconfiguration, forwarder 120 may enforce the general policy but not the update specific policy. Controller 140 optionally at a later time reconfigures forwarder 120 in accordance with the update specific policy if the monitored condition(s) are then indicative that the update specific policy is to be enforced. The monitoring and reconfiguration may be repeated as applicability/non-applicability of the update specific policy toggles dependent on the condition(s). For example, the monitoring and reconfiguration may be repeated until the update(s) are accessed (e.g. as determined in a subsequent iteration of stage 236) or until the non-installed update(s) are no longer relevant in accordance with at least one criterion, for instance due to newer update(s) in update repository 130 superseding the non-accessed update(s). Stage 248 may be omitted, for instance, if monitoring by controller 140 is not necessary. For example, monitoring may not be necessary if there are no condition(s) governing the timing of enforcement of the update specific policy, or if the update specific policy included such condition(s) so that forwarder 120 enforces the update specific policy when the condition(s) are indicative that the update specific policy is to be enforced, and does not enforce the update specific policy when the condition(s) are indicative that the update specific policy is not to be enforced.

In optional stage 252, controller 140 may collect data resulting from the access and/or installation processes of stages 228 and/or 232. Controller 140 may collect the data during the access and/or installation processes (e.g. by monitoring the processes in stage 228 and/or 232). Additionally or alternatively, controller 140 may collect the data (e.g. by receiving the data) after the access and/or installation processes have been completed. For example, the collected data may include specifics on connections (e.g. speed of connections), protocols, different elements of transport, encryption/non-encryption, security threats, infrastructure, and/or other network capabilities, etc., which may have implication(s) on future accessing. Combined data manager 150 may be adapted to store the collected data so that the collected data may affect accessing and/or installing future update(s) for IoT device 110; and/or so that the collected data may affect other future accessing (e.g. general access) with respect to IoT device 110. For example, controller 120 may cause the general policy to be modified for the collected data, by providing the collected data to combined data manager 150. Combined data manager 150 may modify the general policy by including the collected data in the general policy (e.g. the collected data may be included as an extension to a MUD policy that is the general policy). Combined data manager 150 may then store the modified general policy (e.g. the MUD policy with an extension for the collected data). In such an example, potential implications of the collected data on future accessing may be taken into account through the modification of the general policy. The modification of the general policy for IoT device 110 may or may not affect subsequent update specific policies (for IoT device 110), depending on the particulars of the modification. If stage 252 is performed over a plurality of iterations of method 200 relating to various updates for IoT device 110, the general policy (e.g. MUD policy) may be dynamically modified as the iterations progress.

In some embodiments, method 200 may include more, fewer, and/or different stages than illustrated in FIG. 2. In some embodiments, the order of stages may differ from the order illustrated in FIG. 2. In some embodiments, stages that are shown in FIG. 2 as being performed sequentially may be performed in parallel; and/or stages that are shown in FIG. 2 as being performed in parallel may be performed sequentially.

Method 200 may be repeated for IoT device 110, as necessary. For example, method 200 may be repeated when subsequently combined data is obtained in another iteration of stage 204. If stage 204 is repeated over a plurality of iterations, various combined data may be dynamically formed, and consequently, various update specific policies may be dynamically formulated over a plurality of iterations of stage 216. For example, in embodiments where the combined data includes a MUD policy with an extension, the extension including the update metadata or a pointer to the update metadata; the MUD policy with the extension may be dynamically modified, as the update metadata or the pointer varies during the course of the iterations for various updates.

Figure 3:
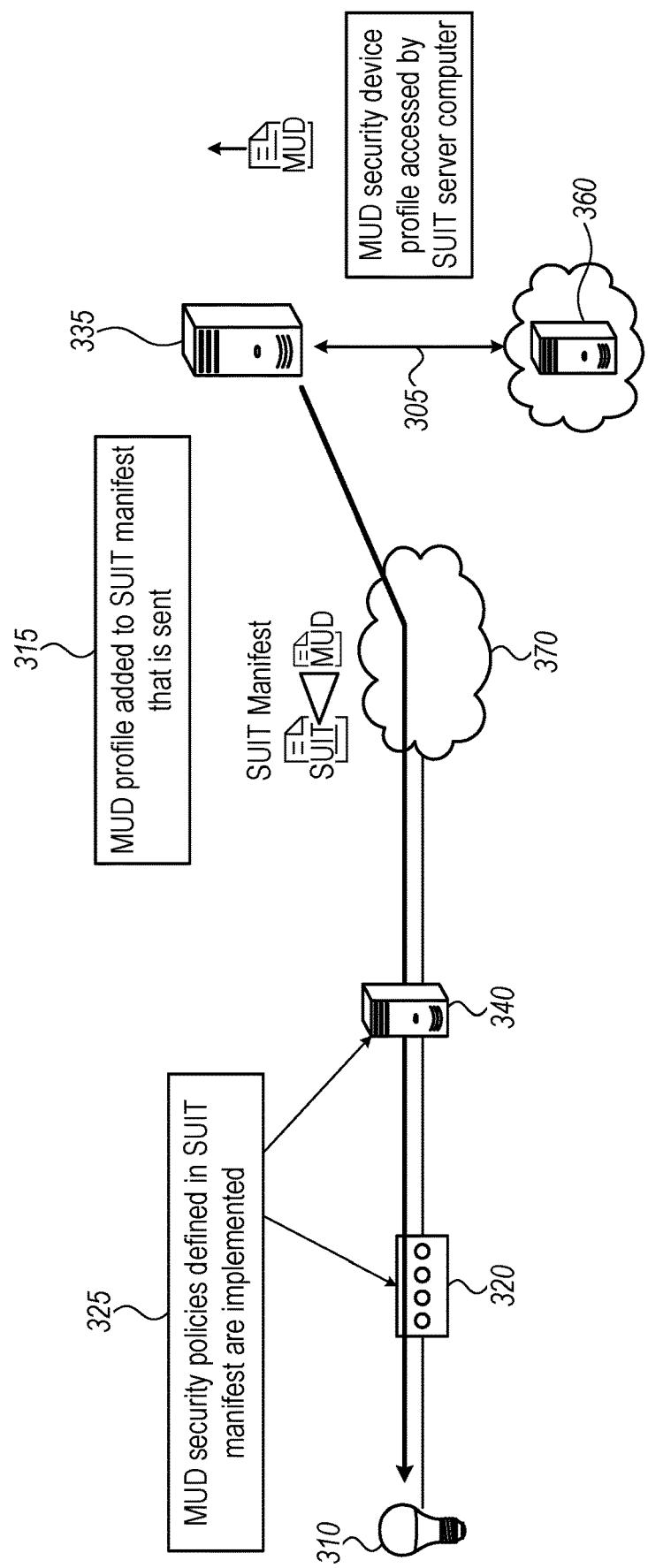
FIGS. 3 and 4 are pictorial illustrations, in accordance with some embodiments of the presently disclosed subject matter.
Figure 4:
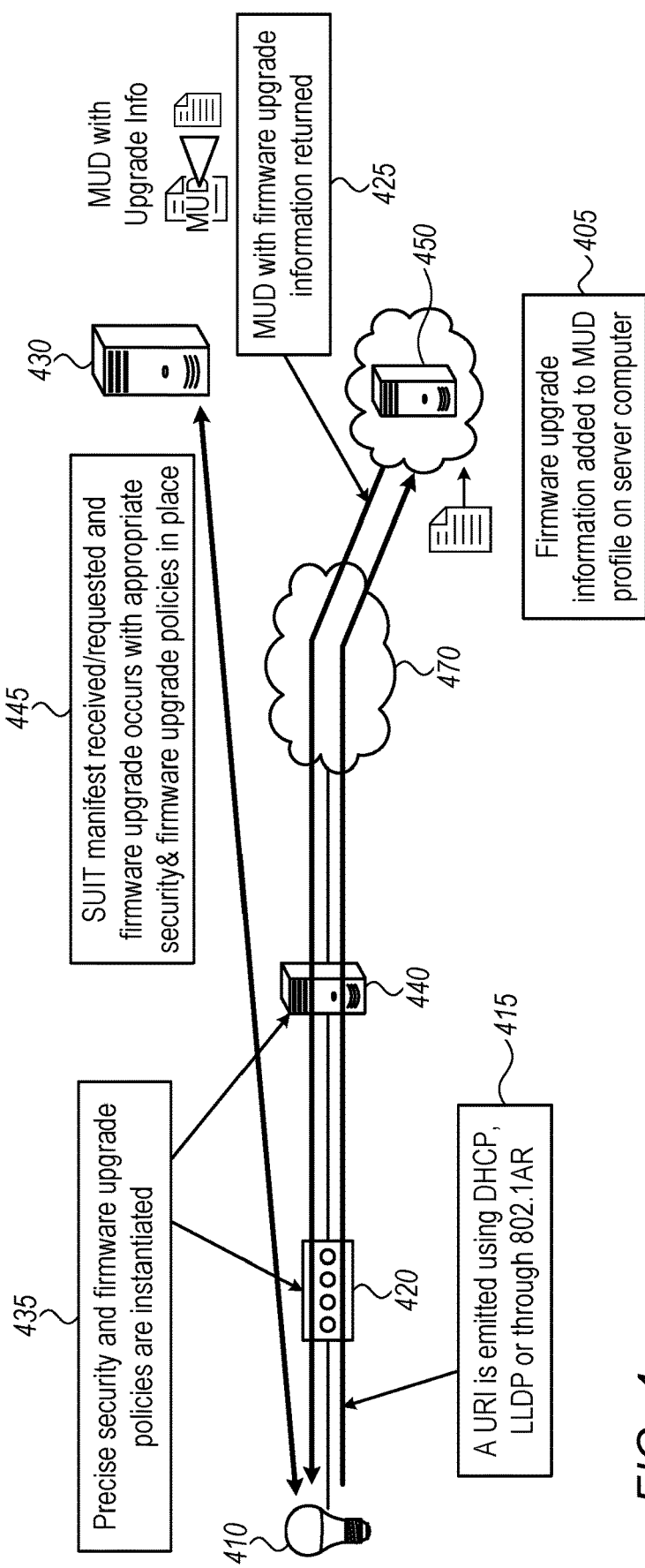

FIGS. 3 and 4 are pictorial illustrations, in accordance with some embodiments of the presently disclosed subject matter.

FIG. 3 illustrates the insertion of a MUD policy (also referred to herein as a MUD profile, MUD security device profile or a MUD security device policy, MUD policies, etc.) into a SUIT manifest.

A MUD policy (which is an example of a general policy described above) is stored in a MUD file server computer 360. MUD file server computer 360 is shown in FIG. 3 as being in "the cloud". A SUIT manifest (which is an example of an update manifest described above) and the corresponding firmware image is stored in a SUIT firmware images server computer 335. The firmware image is an example of an update described above.

In stage 305, the SUIT manifest is extended to include the MUD policy, or in other words the MUD policy is added as an extension to the SUIT manifest. The SUIT manifest with the extension for the MUD policy may be an example of combined data described above. The SUIT manifest may be an example of the update metadata that is included in the combined data, described above. The MUD policy may be an example of the policy data that is included in the combined data, described above. The SUIT manifest with the extension for the MUD policy is stored in SUIT firmware images server computer 335. SUIT firmware images server computer 335 may be an example of a physical unit which at least partly implements update repository 130 (FIG. 1). MUD file server computer 360 and/or SUIT firmware images server computer 335 may be an example of physical unit(s) which at least partly implement combined data manager 150 (FIG. 1). Stage 305 may be an example of stages 204 and 208 of FIG. 2.

In stage 315, the SUIT manifest with the extension for the MUD policy is sent by SUIT firmware images server computer 335, for instance via the Internet 370. The SUIT manifest with the extension for the MUD policy is sent to a MUD controller 340. The SUIT manifest with the extension for the MUD policy, or the SUIT manifest stripped from the MUD policy is then sent by MUD controller 340 to a light bulb or a hub thereof 310. Light bulb (and optionally hub thereof) 310 may be an example of physical unit(s) which implements IoT device 110 (FIG. 1). Stage 315 may be an example of stages 212 and 224 (FIG. 2).

In stage 325, MUD controller 340 configures an access switch 320 in accordance with the MUD policy and the SUIT manifest (referred to in FIG. 3 as the MUD security policies defined in the SUIT manifest being implemented). Access switch 320 may be an example of a network device. Access switch 320 may be an example of a physical unit that at least partly implements forwarder 120 of FIG. 1, and MUD controller 340 may be an example of a physical unit (e.g. a computer) that at least partly implements controller 140 (FIG. 1). Stage 325 may be an example of stage 220 (FIG. 2), where the configuration in accordance with the MUD policy and the SUIT manifest may be an example of a configuration in accordance with an update specific policy described above. Lightbulb or hub 310 may subsequently access the firmware image in a stage that is an example of stage 228 (FIG. 2).

FIG. 4 illustrates the insertion of firmware upgrade information into a MUD profile.

A MUD profile (which is an example of a general policy) is stored in a MUD file server computer 450. MUD file server computer 450 is shown in FIG. 4 as being in "the cloud". A SUIT manifest (which is an example of an update manifest) and the corresponding firmware image is stored in a SUIT firmware images server computer 430. A firmware image is an example of an update.

In stage 405, firmware upgrade information that is also included in the SUIT manifest is added to the MUD profile, as an extension to the MUD profile. The MUD profile with the extension for the firmware upgrade information may be an example of combined data described above. The firmware upgrade information may be an example of the update metadata that is included in the combined data described above. The firmware upgrade information may include any of the examples of metadata in the update manifest that were described above. The MUD profile may be an example of the policy data that is included in the combined data. The MUD profile with the extension for the firmware upgrade information is stored in MUD file server computer 450. SUIT firmware images server computer 430 may be an example of a physical unit which at least partly implements update repository 130 (FIG. 1). MUD file server 450 and/or SUIT firmware images server 430 may be an example of physical unit(s) which at least partly implement combined data manager 150 (FIG. 1). Stage 405 may be an example of stages 204 and 208 of FIG. 2.

In stage 415, a light bulb (or a hub thereof) 410 emits a URI. The URI may be emitted using DHCP, LLDP, and/or 802.1AR, etc. Light bulb (and optionally hub thereof) 410 may be an example of physical unit(s) implementing IoT device 110 (FIG. 1). The URI may be indicative of the MUD profile with the extension for the firmware upgrade information.

In stage 425, a MUD controller 440 uses the URI and HTTPS to retrieve, via the Internet 470, the MUD profile with the extension for the firmware upgrade information from MUD file server 450. The MUD profile with the extension for the firmware upgrade information is thus returned to MUD controller 440. Stage 425 may be an example of stage 212 (FIG. 2).

In stage 435, MUD controller 340 configures an access switch 420 in accordance with the MUD policy and the firmware upgrade information (referred to in FIG. 4 as precise security and firmware upgrade policies being instantiated). Access switch 420 may be an example of a network device. Access switch 420 may be an example of a physical unit that at least partly implements forwarder 120 of FIG. 1, and MUD controller 440 may be an example of a physical unit (e.g. a computer) that at least partly implements controller 140 (FIG. 1). Stage 435 may be an example of stage 220 (FIG. 2), where the configuration in accordance with the MUD policy and the firmware upgrade information may be an example of a configuration in accordance with an update specific policy described above.

In stage 445, light bulb or hub 410 requests and receives the SUIT manifest and the firmware image (referred to in FIG. 4 as the firmware upgrade), with appropriate security policies in place in access switch 420. Stage 445 may be an example of the requesting and receiving in stage 226, and an example of stage 228 (FIG. 2).

The insertions described in FIGS. 3 and 4 may both be applied, or one or the other may be applied, depending on the embodiment. In some embodiments, other methods may be applied with reference to an update manifest (e.g. SUIT manifest) and a general policy (e.g. MUD policy), in addition to or instead of the methods described in FIGS. 3 and 4.

Figure 5:
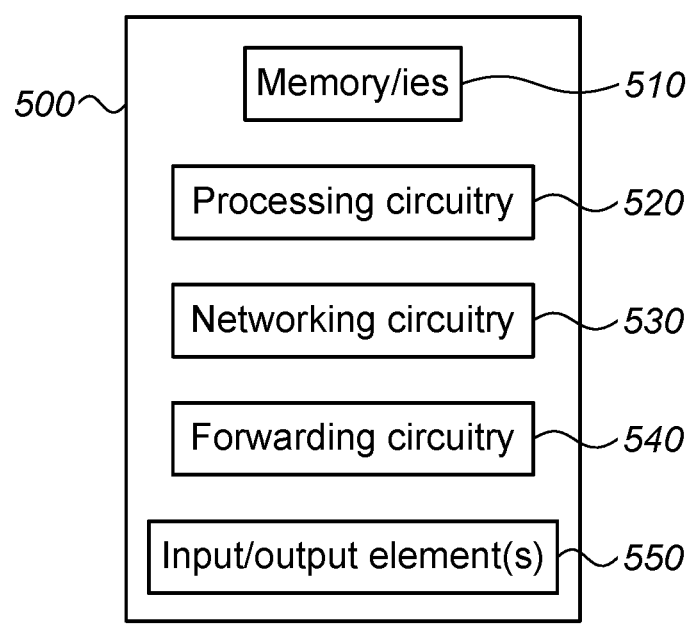
FIG. 5 is a block diagram of an apparatus, in accordance with some embodiments of the presently disclosed subject matter.

FIG. 5 is a block diagram of an apparatus 500, in accordance with some embodiments of the presently disclosed subject matter.

There may be one or more apparatuses 500 implementing system 100 (FIG. 1). For example, a particular apparatus 500 may implement one or more of the functional modules shown in FIG. 1, and/or part(s) of one or more of the functional modules shown in FIG. 1.

A particular apparatus 500 may be concentrated in one location, for instance including a single physical unit; or for instance including separate physical units that are connected by cable and/or separate physical units that are not connected by cable. Alternatively, a particular apparatus 500 may include physical units distributed over a plurality of locations. Elements (e.g. 510, 520, 530, 540, and/or 550, etc. to be described below) that are included in a particular apparatus 500 may be suitably located in the physical unit(s) comprised in the particular apparatus 500.

A particular apparatus 500 includes the following elements: at least one memory 510 (also referred to as least one computer readable storage medium 510), processing circuitry 520, and networking circuitry 530. Networking circuitry 530 may include any appropriate networking circuitry for communicating with other apparatus(es), if any, that are partly implementing system 100, for communicating with further apparatus(es) that are not implementing system 100; and/or for communicating between physical units included in particular apparatus 500, if particular apparatus 500 includes a plurality of physical units. Networking circuitry 530 may include networking elements for wireless communication (e.g. any of antenna(s), transmitter(s)/receiver(s), etc.) and/or networking elements for wired communication (e.g. wired network interface(s) such as virtual/physical port(s), wired network switch(es), etc.).

Each of the at least one memory 510 may be of any appropriate type such as an optical computer readable storage medium, a magnetic computer readable storage medium, or an electronic computer readable storage medium (e.g. made up of electronic element(s) such as capacitor(s) and/or transistor(s), etc. that are in integrated circuit(s) and/or on printed circuit board(s), etc.). If there is a plurality of memories 510, any two memories 510 in the plurality may be of the same type or different types. The at least one memory 520 may include, for instance, any of the following: volatile, non-volatile, erasable, non-erasable, removable, non-removable, writeable, re-writeable memory, for short term storing and/or for long term storing, etc., such as flip flops, latches, counters, shift register(s), other register(s), cache(s), random access memory (RAM), read-only memory (ROM), static random access memory (SRAM), dynamic random access memory (DRAM), flash memory, embedded DRAM, Double-Data-Rate DRAM (DDR-DRAM), SDRAM, programmable ROM (PROM), erasable programmable ROM (EPROM), electrically erasable programmable ROM (EEPROM), Compact Disk ROM (CD-ROM), Compact Disk Recordable (CD-R), Compact Disk Rewriteable (CD-RW), flash memory (e.g., NOR or NAND flash memory), content addressable memory (CAM), polymer memory, phase-change memory, ferroelectric memory, silicon-oxide-nitride-oxide-silicon (SONOS) memory, a disk, a floppy disk, a hard drive, an optical disk, a magnetic disk, a card, a magnetic card, an optical card, a tape, and/or a cassette, etc.

Memory/ies 510 may store data used by processing circuitry 520. For example, in embodiments where processing circuitry 520 includes processor(s), memory/ies 510 may store data used by processor(s) which is computer readable program code, the processor(s) being adapted to execute such computer readable program code in order to perform at least part of the functionality attributed to particular apparatus 500. As another example, the at least one memory 510 may additionally or alternatively store data, other than computer readable code, relating to the subject matter, that is used by processing circuitry 520 (e.g. combined data, update manifests, general policies, update specific policies, updates, and/or interim data generated during operations of processing circuitry 520; etc.) The location of any particular memory 510 relative to the processing circuitry 520 (e.g. including processor(s)) which uses the data stored in the particular memory 510 may vary depending on the embodiment and may include any appropriate location (e.g. in the same physical unit, not in the same physical unit but otherwise in the same location, remote, etc.).

Processing circuitry 520 may be adapted to perform at least part of the functionality attributed herein to particular apparatus 500, including functionality relating to communicating via networking circuitry 530 and/or other functionality.

Processing circuitry 520 may include, for instance, electronic element(s) such as resistor(s), inductor(s), capacitor(s), diode(s), transistor(s), and/or other switching component(s), etc. Processing circuitry 520 may additionally or alternatively include, for instance combinational logic element(s) such as combinational logic gates (e.g. OR gate(s), AND gate(s), XOR gate(s), NOT gate(s), NOR gate(s), NAND gate(s), and/or XNOR gate(s), etc.) and/or combinational logic circuitry (e.g. comparator(s), adder(s), multiplier(s), and/or multiplexer(s), etc.) Such combinational logic element(s) are typically made up of electronic element(s) such as the examples of electronic elements mentioned above in the current paragraph. Processing circuitry 520 may additionally or alternatively include processor(s) (e.g. made up of electronic element(s) such as described above). A combination of processing circuitry 520 (e.g. including combinational logic), and memory/ies 510, such as flip flops, may make up state machine(s) and/or sequential logic circuitry. Processing circuitry 520 may additionally or alternatively include one or more of any appropriate type(s) of integrated circuit(s) (e.g. field programmable gate array(s) (FPGA(s)), application specific integrated circuit(s) (ASIC(s)), and/or full-custom integrated circuit(s), etc.), printed circuit board(s) (also referred to as printed circuit board assemblies), and/or the like, which may for instance comprise processing circuitry (such as the examples of processing circuitry 520 described above in the current paragraph) that is suitable for inclusion in such integrated circuit(s), printed circuit board(s) and/or the like. Optionally such integrated circuits, printed circuit boards and/or the like may also include other elements such as networking circuitry 530 and/or memory/ies 510. If processor(s) are included in processing circuitry 520, each included processor may be of any suitable type operative to execute instructions, such as a load store processor, a processing pipe, a programmable very long instruction word (VLIW) engine, etc. Processor(s) may include, for example, any of the following: graphics processing unit(s) (GPU(s)), digital signal processor(s) (DSP(s)) central processing units (CPU(s)), etc. The term computer, as used herein, refers to a particular apparatus 500 that includes at least one of the processor(s), if any, that is comprised in processing circuitry 520.

Optionally, particular apparatus 500 (e.g. if implementing forwarder 120 of FIG. 1 or a part thereof) further includes forwarding circuitry 540. Forwarding circuitry 540 may be adapted to perform certain functionality attributed to particular apparatus 500. For example, forwarding circuitry 540 may be adapted to perform forwarding, blocking and/or other appropriate operation(s) on data e.g. in accordance with a configured general policy, and/or in accordance with a configured update specific policy etc. The forwarding of data may include operation(s) such as bridging and/or routing, etc. Forwarding circuitry 540 may include, for instance, ASIC(s) and/or FPGA(s), etc. A forwarding ASIC may include, for instance, forwarding circuitry such as any of the following: packet buffer memory, forwarding controller(s), network interface(s), queue(s) memory, and/or look up table(s) memory, etc.

Optionally, particular apparatus 500 further includes one or more other elements known in the art such as input/output element(s) 550 for interacting with users of the apparatus 500, etc. Examples of an input element includes a keyboard, keypad, mouse, microphone etc.). Examples of an output element includes a speaker, any type of non-touch screen, etc. Examples of an integrated input/output element includes a touchscreen, etc.

A particular apparatus 500 that includes forwarding circuitry 540 may include one or more physical units. For example, a particular apparatus 500 which includes forwarding circuitry 540 may include one or more switches, routers, firewalls, wireless access points, and/or other appropriate network devices. As another example, a particular apparatus 500 which includes forwarding circuitry 540 may include one or more switches, routers, firewalls, wireless access points, and/or other appropriate network devices and may also implement fog capabilities. The fog capabilities may include, for instance, cryptographic capabilities, storage and/or computation capabilities. The fog capabilities may be capabilities on one or more of the switch(es), router(s), firewall(s), wireless access point(s) and/or other appropriate network device(s); or may be on one or more physical unit(s) implementing fog node(s), the physical unit(s) being separate from (e.g. adjacent to) one or more of the switch(es), router(s), firewall(s), wireless access point(s) and/or other appropriate network device(s).

One or more of such particular apparatus(es) 500 which includes forwarding circuitry 540 may implement forwarder 120. In some embodiments, the particular apparatus(es) 500 which implement forwarder 120 may include one switch, router, firewall, wireless access point or other appropriate network device; whereas in other embodiments the particular apparatus(es) 500 which implement forwarder 120 may include a plurality of switch(es), router(s), firewall(s), wireless access point(s), and/or other appropriate network device(s). In the latter embodiments, the update specific policy for IoT device 110 may be configured in forwarding circuitry 540 included in only one switch, router, firewall, wireless access point, or other appropriate network device in any given path of access for IoT device 100 (or in any given path of access between IoT device 110 and the update(s)). For example, the update specific policy may be configured in forwarding circuitry 540 that is included in an access switch or wireless access point which connects to a physical unit at least partly implementing IoT device 110; or that is included in another network device in a given path, if the access switch or wireless access point remains configured for the general policy. Alternatively, in the latter embodiments, for a given path of access for IoT device 110 or for a given path of access between IoT device 110 and the update(s), the update specific policy may be configured in forwarding circuitry 540 that is included in one or more switches, routers, firewalls, wireless access points, and/or other appropriate network devices in the given path. Similarly, the action(s) for which forwarder 120 is configured to be performed (see stage 244) may be configured in such embodiments in only one switch, router, wireless access point, firewall, or other appropriate network device in any given path of access for IoT device 100; or for a given path of access for IoT device 110, the action(s) may be configured in one or more switches, routers, firewalls, wireless access points, and/or other appropriate network devices in the given path.

The location(s) of apparatus(es) 500 which implement combined data manager 150 and/or update repository 130 relative to apparatus(es) 500 implementing IoT device 110 may vary depending on the implementation. For example, apparatus(es) 500 implementing combined data manager 150 and/or update repository 130 may be located in a local area network which includes the apparatus(es) implementing IoT device 110. The location(s) of apparatus(es) 500 implementing combined data manager 150 and/or update repository 130 may additionally or alternatively be outside of such a local area network which includes the apparatus(es) implementing IoT device 110. For example, apparatus(es) 500 implementing combined data manager 150 and/or update repository 130 may be located in layers of a fog hierarchy, situated between the local area network and the cloud. As another example, apparatus(es) implementing combined data manager 150 and/or update repository 130 may be situated in a data center connecting to the local area network via the Internet.

Advantages of the subject matter may include any of the following. First, in addition to or instead of a general policy being enforced, a policy that is specific to update(s) may be enforced. For example, an update specific policy may include access control list(s) relating to the update(s). Enforcement of such an update specific policy may encourage appropriate updating and discourage inappropriate updating of IoT device 110. Inappropriate updating may thwart improved performance of IoT device 110; may lead to malfunctioning of IoT device 110; and/or may lead to complications at IoT device 110 and/or at other elements communicating with IoT device 110. Second, access to update(s) may be dynamic, e.g. due to the various condition(s) described above. Third, update(s) may be tailored to IoT devices (e.g. a particular update may be tailored to a particular group of one or more IoT devices). Such tailoring potentially allows the management (e.g. the management of the updating) of even a single IoT device (e.g. IoT device 110) as a unique entity among a plurality (e.g. potentially millions) of IoT devices. For example, update(s) may be limited to IoT devices for which the update(s) are relevant in accordance with at least one criterion. Assuming, for instance, that relevance criterion/criteria includes vulnerability, if IoT device 110 is vulnerable to a particular complication that is addressed by the update, the update may be more likely to be installed, but if IoT device 110 is not vulnerable, then the update may be less likely to be installed. Fourth, action(s), such as the use of a trustworthiness metadata channel for data originating from IoT device 110, may be configured if IoT device 110 has not yet installed update(s)/critical update(s). Fifth, information on connections, protocols, different elements of transport, encryption/non-encryption, security threats, infrastructure, and/or other network capabilities, resulting from the access and installation processes may be collected and stored. For example, such information may be used to dynamically modify the general policy. Other advantages may be apparent from the description herein.

It will be appreciated that the subject matter contemplates, for example, a computer program product comprising a computer readable medium having computer readable program code embodied therein for causing a computer to execute one or more methods and/or one or more parts of method(s) disclosed herein, such as method 200 (FIG. 2). Further contemplated, for example, are computer readable program code for causing a computer to execute method(s) and/or part(s) of method(s) disclosed herein; and/or a computer readable medium having computer readable program code embodied therein for causing a computer to execute method(s) and/or part(s) of method(s) disclosed herein. A computer readable medium, for example, may include any suitable medium for transferring computer readable program code, e.g. if software is downloaded to the processor(s) in electronic form, over a network. Alternatively or additionally, a computer readable medium may include any suitable computer readable storage medium for storing computer readable program code, such as described above.

In the above description of example embodiments, numerous specific details are set forth in order to provide a thorough understanding of the subject matter. However, it will be appreciated by those skilled in the art that some examples of the subject matter may be practiced without these specific details. In other instances, well-known features have not been described in detail so as not to obscure the subject matter.

It will also be appreciated that various features of the subject matter which are, for clarity, described in the contexts of separate embodiments may also be provided in combination in a single embodiment. Conversely, various features of the subject matter which are, for brevity, described in the context of a single embodiment may also be provided separately or in any suitable subcombination.

It will further be appreciated by persons skilled in the art that the presently disclosed subject matter is not limited by what has been particularly shown and described hereinabove. Rather the scope of the subject matter is defined by the appended claims and equivalents thereof:

What is claimed is:

1. An apparatus, comprising:
   at least one memory; and processing circuitry;
   the processing circuitry adapted to:
   obtain combined data, the combined data including:
      policy data, or a pointer to the policy data, the policy data relating to general access for an Internet of Things (IoT) device, and
      update metadata, or a pointer to the update metadata, the update metadata relating to at least one update that is relevant to the IoT device in accordance with at least one criterion, and
   cause access of the IoT device to the at least one update to be in accordance with an update specific policy that is based on the combined data.

2. The apparatus of claim 1, wherein the processing circuitry being adapted to obtain the combined data includes being adapted to form the combined data by combining at least the policy data, or the pointer to the policy data, and the update metadata or the pointer to the update metadata.

3. The apparatus of claim 1, further comprising networking circuitry, wherein the processing circuitry being adapted to obtain, includes being adapted to receive the combined data, via the networking circuitry.

4. The apparatus of claim 1, further comprising networking circuitry, wherein the processing circuitry being adapted to cause, includes the processing circuitry being adapted to send the combined data or the update specific policy, via the networking circuitry.

5. The apparatus of claim 1, wherein the processing circuitry being adapted to cause, includes the processing circuitry being adapted to formulate the update specific policy based on the combined data.

6. The apparatus of claim 1, wherein the processing circuitry being adapted to cause, includes the processing circuitry being adapted to configure forwarding circuitry to enforce the update specific policy.

7. The apparatus of claim 6, wherein the forwarding circuitry is comprised in the apparatus.

8. The apparatus of claim 1, wherein the at least one memory stores the at least one update.

9. The apparatus of claim 1, wherein the at least one memory stores at least one of the combined data, an update manifest which includes the update metadata, or a general policy which includes the policy data.

10. The apparatus of claim 9, wherein the update manifest is a Software Updates for Internet of Things (SUIT) manifest and the general policy is a Manufacturer Usage Description (MUD) policy.

11. The apparatus of claim 1, wherein the combined data includes a Manufacturer Usage Description (MUD) policy with an extension for the update metadata or the pointer to the update metadata.

12. The apparatus of claim 1, wherein the combined data includes a Software Updates for Internet of Things (SUIT) manifest with an extension for the policy data or the pointer to the policy data.

13. A method comprising:
    obtaining combined data, the combined data including:
       policy data, or a pointer to the policy data, the policy data relating to general access for an Internet of Things (IoT) device, and
       update metadata, or a pointer to the update metadata, the update metadata relating to at least one update that is relevant to the IoT device in accordance with at least one criterion;
    formulating an update specific policy based on the combined data; and
    configuring access of the IoT device to the at least one update, to be in accordance with the update specific policy.

14. The method of claim 13, further comprising: receiving a uniform resource identifier emitted by the IoT device, wherein said obtaining occurs subsequent to said receiving.

15. The method of claim 13, wherein the update specific policy is enforced in accordance with at least one condition relating to: network load, time of day, time since last updating, time slice when the at least one update is available, or expiration of the update specific policy.

16. The method of claim 13, further comprising: collecting information relating to at least one of: access or installation of the at least one update.

17. The method of claim 13, further comprising: configuring at least one action to be performed with respect to the IoT device, if the IoT device has not yet installed the at least one update.

18. The method of claim 17, wherein the at least one action includes quarantining the IoT device, blocking access with respect to the IoT device and certain resource(s), modifying the routing of data originating from the IoT device, or using a trustworthiness metadata channel to indicate the trustworthiness of data originating from the IoT device.

19. The method of claim 13, wherein the combined data includes at least one of:
    a Manufacturer Usage Description policy with an extension for the update metadata or the pointer to the update metadata, or
    a Software Updates for Internet of Things manifest with an extension for the policy data or the pointer to the policy data.

20. A computer program product, comprising a non-transitory computer readable medium having computer readable program code embodied therein, the computer program product comprising:
    computer readable program code for causing at least one computer to obtain combined data, the combined data including:
       policy data, or a pointer to the policy data, the policy data relating to general access for an Internet of Things (IoT) device, and
       update metadata, or a pointer to the update metadata, the update metadata relating to at least one update that is relevant to the IoT device in accordance with at least one criterion;
    computer readable program code for causing the at least one computer to formulate an update specific policy based on the combined data; and
    computer readable program code for causing the at least one computer to configure access of the IoT device to the at least one update, to be in accordance with the update specific policy.

* * * * *

UNITED STATES PATENT AND TRADEMARK OFFICE
CERTIFICATE OF CORRECTION

PATENT NO. : 10,581,690 B2
APPLICATION NO. : 15/921680
DATED : March 3, 2020
INVENTOR(S) : Gonzalo Salgueiro et al.

Page 1 of 1

It is certified that error appears in the above-identified patent and that said Letters Patent is hereby corrected as shown below:

In the Specification

Column 15, Line 43, please amend as shown:
mine whether or not IoT device 110 has accessed the Signed and Sealed this
Thirtieth Day of June, 2020

Andrei Iancu
*Director of the United States Patent and Trademark Office*